United States Patent
Corghi

(10) Patent No.: US 8,684,060 B2
(45) Date of Patent: Apr. 1, 2014

(54) TYRE-CHANGING MACHINE AND A RELATIVE BEAD-BREAKING METHOD

(75) Inventor: Giulio Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 595 days.

(21) Appl. No.: 12/988,767

(22) PCT Filed: Apr. 14, 2009

(86) PCT No.: PCT/EP2009/054368
§ 371 (c)(1),
(2), (4) Date: Oct. 20, 2010

(87) PCT Pub. No.: WO2009/130135
PCT Pub. Date: Oct. 29, 2009

(65) Prior Publication Data
US 2011/0036507 A1 Feb. 17, 2011

(30) Foreign Application Priority Data
Apr. 21, 2008 (IT) .............................. RE2008A0037

(51) Int. Cl.
*B60C 25/135* (2006.01)
*B60C 25/138* (2006.01)
(52) U.S. Cl.
USPC ........................................ 157/1.22; 157/1.24
(58) Field of Classification Search
USPC .................... 157/1.1–1.36, 14–21
See application file for complete search history.

(56) References Cited

U.S. PATENT DOCUMENTS

| | | | |
|---|---|---|---|
| 4,606,393 A | 8/1986 | Cuccolini | |
| 7,108,035 B2 * | 9/2006 | Corghi | 157/1.17 |
| 7,703,497 B2 | 4/2010 | Vignoli | |
| 2003/0150565 A1 * | 8/2003 | Gonzaga | 157/1.28 |
| 2005/0274461 A1 | 12/2005 | Corghi | |

FOREIGN PATENT DOCUMENTS

| | | |
|---|---|---|
| EP | 1 155 880 A2 | 11/2001 |
| EP | 1 607 247 A1 | 12/2005 |

* cited by examiner

*Primary Examiner* — Hadi Shakeri
*Assistant Examiner* — Danny Hong
(74) *Attorney, Agent, or Firm* — Pearne & Gordon LLP

(57) ABSTRACT

A tire-changing machine comprising support means (4) for a wheel, a tool-bearing arm (50) at an end of which a bead-breaking tool (6) is hinged according to a hinge axis (E) which is perpendicular to an axis (A) of the wheel, and first motorised means (32, 33) for causing a relative movement, in a parallel direction to the axis (A) of the wheel, between the support means (4) and the tool-bearing arm (50), such as to press the bead-breaking tool (6) against a flank of a tire on the wheel, characterized in that it comprises second motorised means (64), activatable independently from the first motorised means (32, 33), which second motorised means (64) are destined to rotate the bead-breaking tool (6) about the hinge axis (E) with the tool-bearing arm (50), in order to vary an inclination of the bead-breaking tool (6) with respect to the axis (A) of the wheel which is mounted on the support means (4).

13 Claims, 4 Drawing Sheets

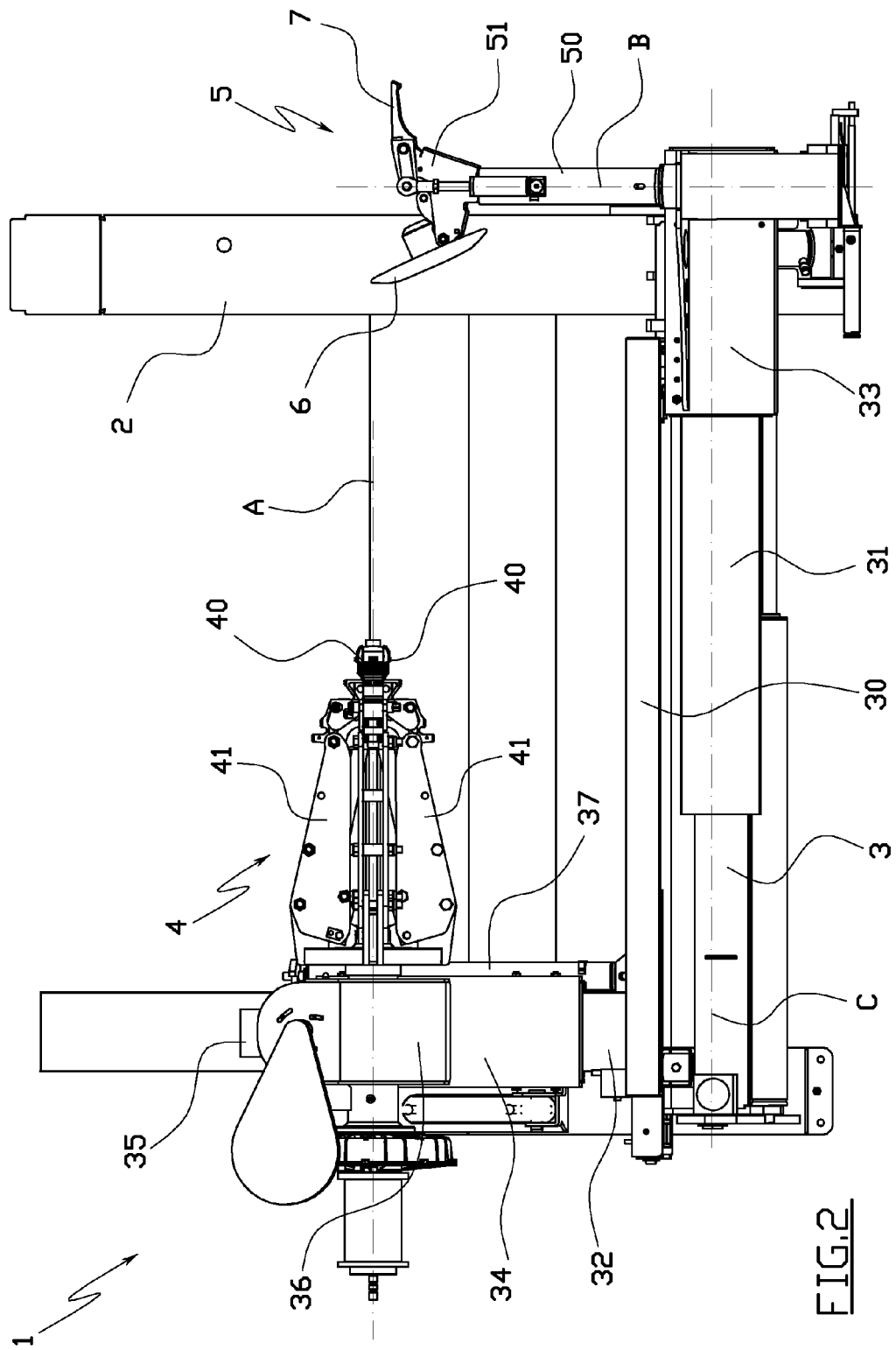

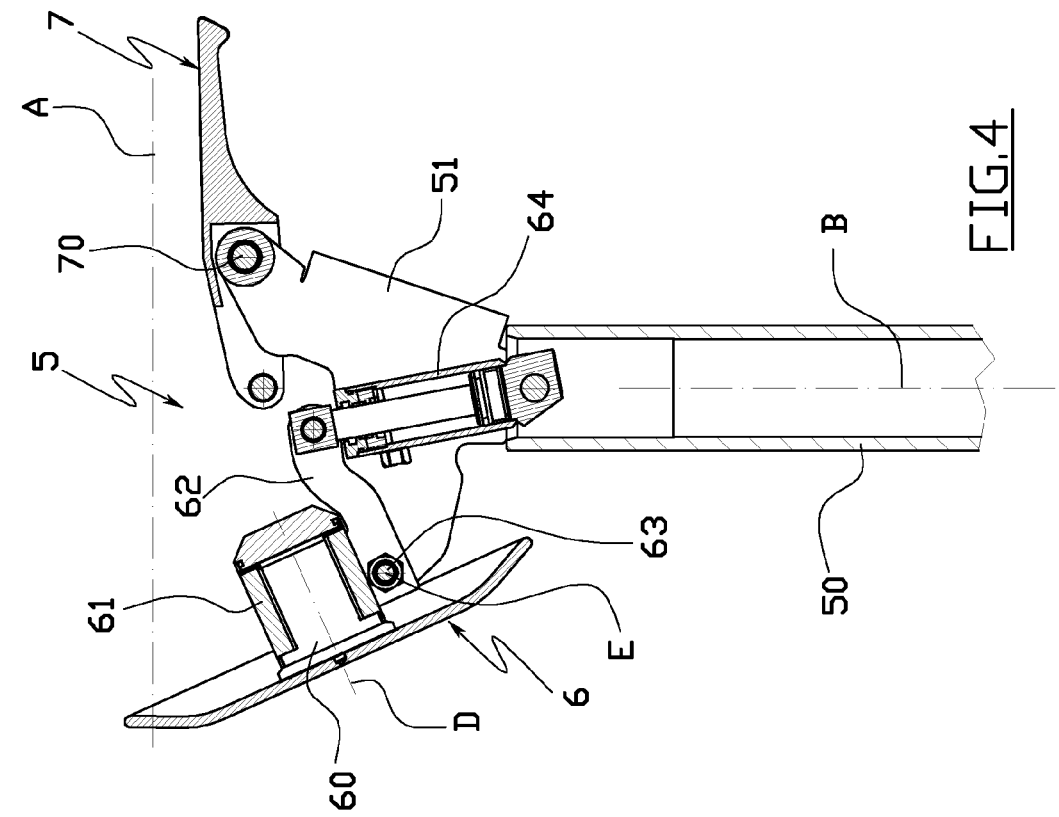
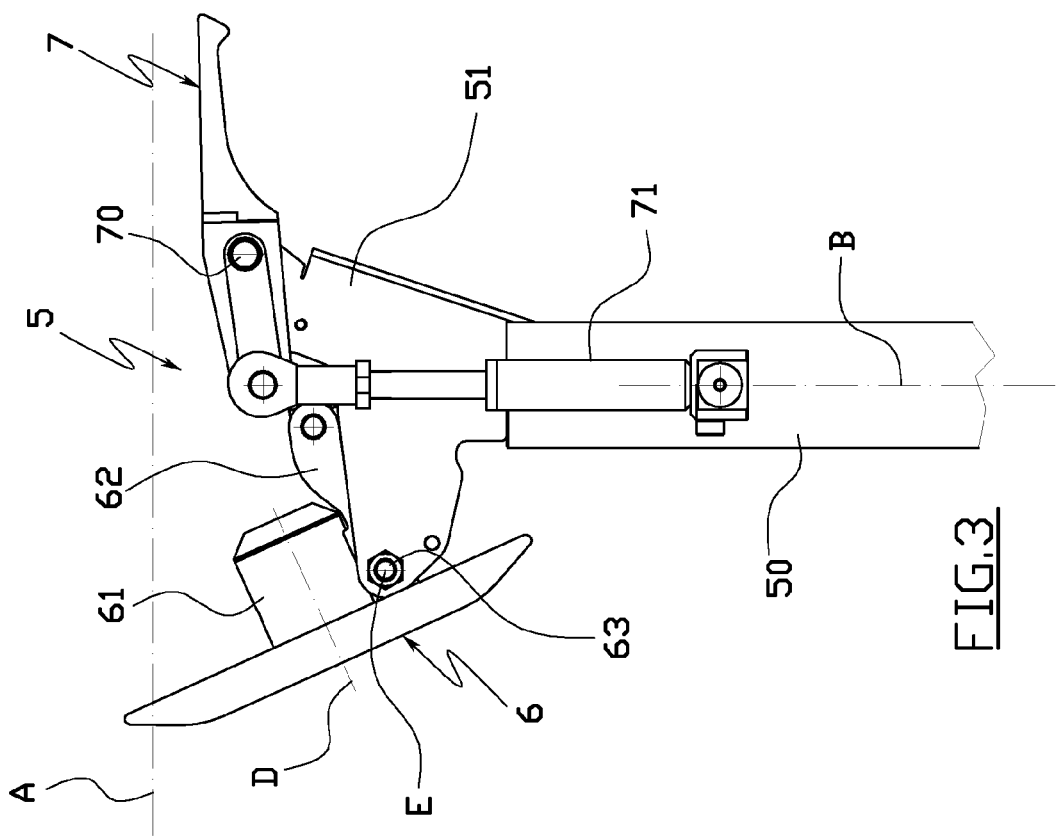

TYRE-CHANGING MACHINE AND A RELATIVE BEAD-BREAKING METHOD

TECHNICAL FIELD

The invention relates in general to a tyre-changing machine, and in particular a tyre-changing machine of a heavy duty type, i.e. a tyre-changing machine predisposed for operating with large-size tyres, such as those which are normally mounted on lorries or agricultural tractors.

BACKGROUND ART

As is known, heavy-duty tyre-changing machines generally comprise a sturdy support frame, on which two slides are mounted, provided with a reciprocal nearing and a distancing movement in a horizontal direction.

A wheel-bearing chuck is mounted on a first slide, which chuck rotates about a rotation axis which is parallel to the sliding direction.

A tool-bearing turret is mounted on-board the second slide, at an end of which a bead-breaking tool and a tyre-demounting tool are mounted, which are positioned on diametrically opposite sides with respect to an axis of symmetry which is perpendicular to the sliding direction.

The tool-bearing turret is rotatable about the axis of symmetry, such as to be blocked in a first operating position, in which it turns the bead-breaking tool to face the wheel-bearing chuck, or in a second operating position, in which it turns the tyre-demounting tool to face the wheel-bearing chuck.

In order to perform the bead-breaking operation, the wheel is blocked in a deflated condition on the wheel-bearing chuck, normally with the aid of special raising devices, while the tool-bearing turret is in the first operating position.

Following this, the chuck is set in rotation and the slides are reciprocally neared such as to press the bead-breaking tool against the flank of the tyre of the wheel, pushing the tool towards the inside of the rim channel, up to detaching the bead of the tyre from the edge of the rim.

The bead-breaking tool is generally a sturdy specially-shaped steel disc, which is destined to rotate idle about the axis thereof, such as not to damage the tyre which rotates solidly with the wheel on the chuck.

The bead-breaking disc is also inclined with respect to the rotation axis of the wheel-bearing chuck, such that during the sliding of the slides, the bead-breaking disc can substantially wedge itself between the flank of the tyre and the edge of the rim, facilitating the detachment of the bead.

As heavy-duty tyre-changing machines must be able to operate with tyres of very different shapes and sizes, the bead-breaking disc is generally connected to the tool-bearing turret by hinging means, which enable an inclination thereof to be made with respect to the rotation axis of the tool-bearing chuck, on the basis of the type of wheel to be operated on.

This regulation is done manually, and the bead-breaking disc can be blocked in a discrete series of different positions, to which correspond various inclinations, by manual blocking means, such as for example a bolt.

The regulation of the inclination is thus done before the true and proper stage of bead-breaking, during which the bead-breaking disc constantly maintains the previously-set inclination.

However, though the inclination of the bead-breaking disc is correctly set, the pressure exerted by the disc against the flank of the tyre does not always enable an effective detachment of the bead, especially when the bead is glued to the edge of the rim.

This difficulty is due both to the practical impossibility of setting a correct inclination of the bead-breaking disc for all wheels to be operated on, and to the fact that the pressure exerted is purely axially, and thus acts exactly in the direction of maximum resistance of the coupling between the tyre bead and the edge of the rim.

In the sector of light-duty tyre-changing machines, i.e. machines predisposed to deal with car wheels, there exist machines whose functional architecture is very similar to that of the heavy-duty machines described herein above.

These light-duty tyre-changing machines comprise a wheel-bearing chuck which rotates about a substantially-vertical rotation axis, and a vertical upright on which a tool-bearing arm is slidably mounted, at a free end of which a bead-breaking disc is hinged, which is destined to be pressed against the flank of the tyre of the wheel, following an axial movement of the tool-bearing arm towards the wheel-bearing chuck.

Further, one of these bead-breaking machines enables the inclination of the bead-breaking disc to be varied with respect to the axis of the wheel-bearing chuck during the axial displacement of the tool-bearing arm, such that the bead-breaking disc performs a roto-translating movement in contact with the tyre, facilitating the detachment of the bead from the edge of the rim.

This effect is obtained by means of a cam-follower organ which is connected to the bead-breaking disc and which follows the profile of a cam fixed on the machine upright such as contemporaneously to obtain a rotation of the bead-breaking disc about the hinge axis thereof with the tool-bearing arm.

Though it improves the bead-breaking stage, this solution does not resolve the drawbacks which have been mentioned in relation to heavy-duty tyre-changing machines.

The bead-breaking disc is constrained to perform a predetermined and a constant roto-translating movement which is effective with a certain type of wheel but which cannot be modified to operate with wheels having different shapes and/or dimensions, if not by physically replacing the cam or other structural components of the tyre-changing machine.

DISCLOSURE OF INVENTION

An aim of the present invention is to obviate the above-described drawback, typical though not exclusive of heavy-duty tyre-changing machines, thus making the bead-breaking stage of the tyre from the rim more reliable and safer.

A further aim of the invention is to attain these objectives with a solution that is simple, rational and relatively inexpensive.

The aims are attained by the characteristics of the invention as reported in the independent claims. The dependent claims, delineate preferred and/or particularly advantageous aspects of the invention.

In particular, the invention provides a tyre-changing machine, preferably though not exclusively of the heavy-duty type, which comprises support means of a wheel, a tool-bearing arm at an end of which a bead-breaking tool is hinged at a hinge axis which is perpendicular to the wheel axis, and first motorised means for causing a relative movement, in a parallel direction to the wheel axis, between the support means and the tool-bearing arm, such as to press the bead-breaking tool against the flank of the tyre of the wheel.

The tyre-changing machine further comprises second motorised means, which are activatable independently of the first motorised means, and which are destined to rotate the bead-breaking tool about a hinge axis thereof with the tool-bearing arm, in order to vary the inclination of the bead-breaking tool with respect to the axis of the wheel mounted on the support means.

The second motorised means enable not only an easy variation in the inclination of the bead-breaking tool on the basis of the type of wheel being operated on, without any manual intervention by the operator, but they also enable the bead-breaking tool to be rotated during the stage of bead-breaking, i.e. when the bead-breaking tool is in contact with the flank of the tyre.

In this way the bead-breaking tool can perform both the usual axial thrust and a levering action which tends to debead and radially distance the tyre bead from the rim edge, facilitating detachment and thus completion of the debeading.

Thanks to the functional independence between the first and the second motorised means, this rotation can be performed contemporaneously with the axial advancement of the bead-breaking tool, thus obtaining a combined action, or it can be performed while the bead-breaking tool is axially stationary in contact with the tyre, practically dividing the bead-breaking operation into two distinct stages, respectively one of axial thrust and another of a lever action.

Further, the functional independence enables the movement to be imposed on the bead-breaking tool to be easily changed, on the basis of the type of wheel being operated on.

In a preferred aspect of the invention, the second motorised means are controllable such as to be able to rotate the bead-breaking tool in both directions continuously between two extreme endrun positions, with the possibility of halting the tool in intermediate positions.

In other words, the second motorised means are preferably not only able to move the bead-breaking tool between two fixed and predetermined stop positions, to which various inclinations correspond, but can also move and stop the bead-breaking tool in a plurality of intermediate positions, thus varying the inclination with substantial continuity between a maximum amount and a minimum amount.

In this way, depending on the wheel to be treated, it is possible not only to precisely regulate the initial inclination of the bead-breaking tool, but it is also possible to regulate the excursion the tool must perform in order to break the tyre bead, increasing the effectiveness and the flexibility of use of the tyre-changing machine.

The second motorised means are preferably associated to manual control means, for example a joystick or keyboard, which enable a user to regulate the inclination of the bead-breaking device using the naked eye, inclining and/or moving the device time-by-time according to the needs of the wheel to be treated, in a way which is very simple and immediate.

Alternatively, the second motorised means could be controlled by automatic control means, specially programmed and programmable on the basis of the type of wheel to be treated.

In a preferred embodiment of the tyre-changing machine of the invention, typical for heavy-duty tyre-changing machines, the tool-bearing arm also bears a tyre-demounting tool and is mobile on the tyre-changing machine between a first and a second operating position, in which it turns respectively the bead-breaking tool or the tyre-demounting tool to face the wheel support means.

As mentioned herein above, the second motorised means rotate the bead-breaking tool with respect to the tool-bearing arm between two extreme endrun positions which define the maximum excursion thereof.

The extreme positions are preferably selected such that at least when the bead-breaking tool is in a first of the extreme positions the minimum radial distance which separates the bead-breaking tool from the axis of the wheel mounted on the support means is greater than the minimum radial distance which separates the wheel axis from the bead-breaking tool mounted on the tool-bearing arm.

Thanks to this solution, during the operating stages in which the tyre-changing machine uses the demounting tool, the bead-breaking tool can be brought into and blocked in the first extreme position, such that it does not interfere with the functioning of the demounting tool.

The invention further provides a bead-breaking method using a tyre-changing machine of the above-described type, which method comprises stages of blocking a wheel on the machine support means, causing a relative movement in a parallel direction to the wheel axis, between the support means and the tool-bearing arm, such as to press the bead-breaking tool against the flank of the tyre of the wheel, and a stage of rotating the bead-breaking tool about the hinging axis thereof with the tool-bearing arm, while the bead-breaking tool is in contact with the tyre, such as to exert an action tending to distance the tyre bead from the edge of the rim.

BRIEF DESCRIPTION OF THE DRAWINGS

Further characteristics and advantages of the invention will better emerge from a reading of the following description, which is provided by way of non-limiting example, with the aid of the figures of the accompanying tables of drawings.

FIG. 2 is a plan view of the tyre-changing machine of FIG. 1.

FIG. 3 is an enlarged detail of FIG. 2 which shows the tool-bearing turret of the tyre-changing machine.

FIG. 4 is the tool-bearing turret of FIG. 3 shown in section.

BEST MODE FOR CARRYING OUT THE INVENTION

Figure 1:
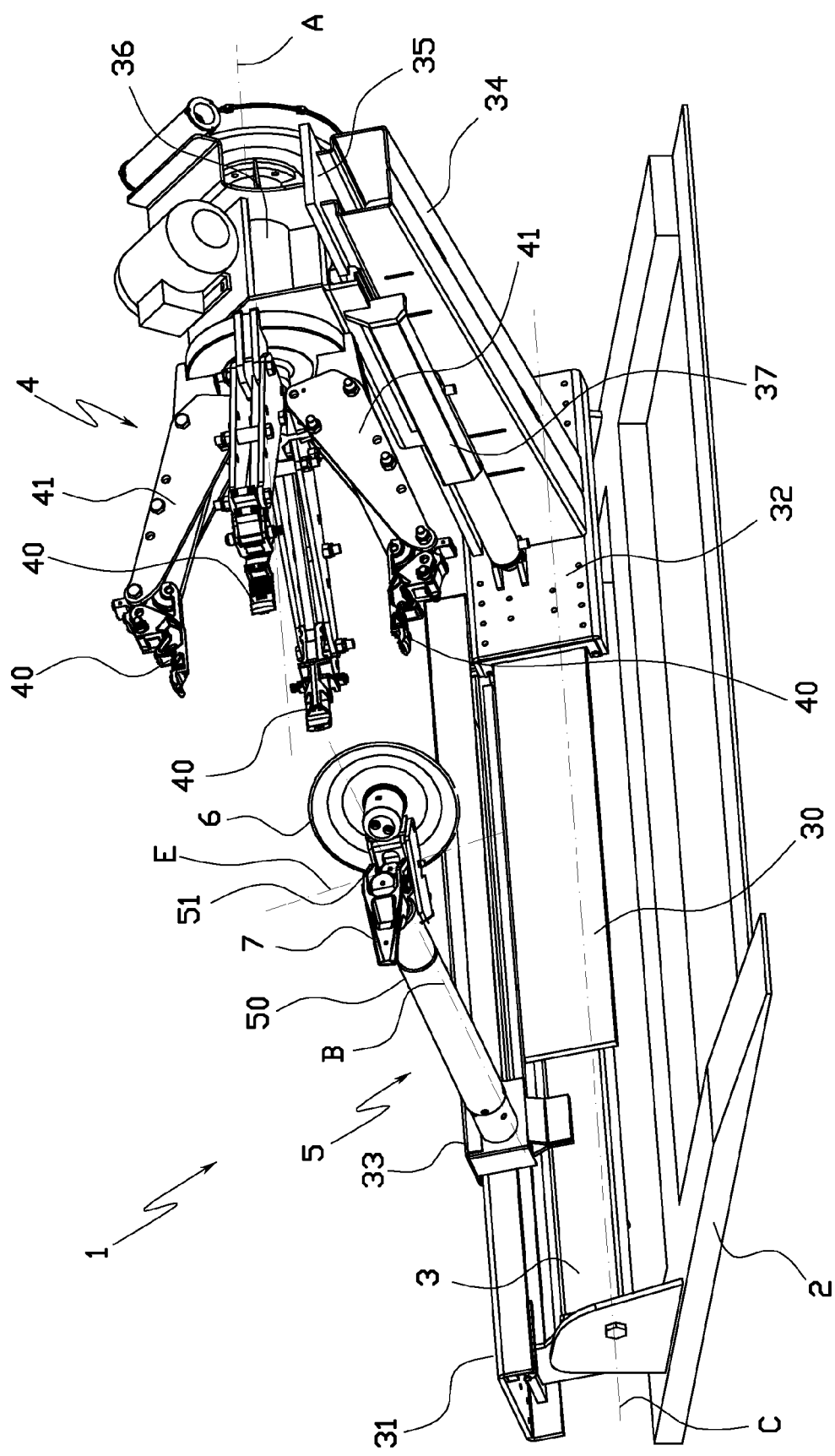
FIG. 1 is a perspective view of a tyre-changing machine of the invention.

The figures illustrate a heavy-duty tyre-changing machine 1, i.e. a tyre-changing machine designed for mounting and demounting large-dimension tyres normally equipped on the wheels of heavy vehicles, such as for example trucks, lorries and agricultural tractors.

The tyre-changing machine 1 comprises a solid base 2 for resting on the ground, on which an orientable support frame 3 is mounted, which frame 3 is articulated to the base 2 on an oscillating horizontal axis C, and is associated to usual motor means (not illustrated) which vary the inclination of the frame 3 with respect to the base 2.

Two parallel straight guides, 30 and 31, are fixed on-board the orientable frame 3, on which respective slides 32 and 33 are slidably coupled.

The slides 32 and 33 are associated to means for activating, of known type, which move the slides 32 and 33 contemporaneously in a reciprocal nearing or distancing motion, in a horizontal direction which is parallel to the oscillation axis C.

In the illustrated example, both the slides 32, 33 are mobile; however it is obviously possible that only one of the two slides 32, 33 might move towards the other, which can be fixed.

A sturdy projecting arm 34 is mounted on the slide 32, which arm 34 is formed by a steel element developing transversally to the sliding direction, and on an upper side of which a straight guide 35 is fixed, on which slide 35 a carriage 36 is slidably coupled, which carriage 36, activated by a hydraulic jack 37 slides longitudinally along the arm 34.

A wheel-bearing chuck 4 is rotatably coupled to the carriage 36, which chuck 4 has a rotation axis A that is parallel to the oscillation axis C of the orientable frame 3, i.e. in the sliding direction of the slides 32, 33.

The wheel-bearing chuck 4 comprises a self-centring group, which blocks a wheel and maintains it in a coaxial position with respect to the rotation axis A. The self-centring group comprises four identical blocking claws 40, which are angularly equidistanced about a circumference centred on the rotation axis A of the chuck 4, such as to be able to remain in direction contact with the rim of the wheel and to press from internally in an external direction against the rim.

The blocking claws 40 are borne at ends of respective oscillating arms 41, which are moved by a single activating system (not completely visible) such that the blocking claws 40 are destined to distance or near contemporaneously to or from the rotation axis A, performing equal radial displacements, and thus constantly remaining arranged on a circumference centred on the rotation axis A.

The wheel-bearing chuck 4 is of known type and is therefore not further described herein.

A tool-bearing turret 5 is mounted on the slide 33, which turret 5 comprises a tubular support body 50, an axis B is which is perpendicular and preferably coplanar with the rotation axis A of the wheel-bearing chuck 4.

The free end of the support body 50 bears a head element 51 on which are mounted a bead-breaking tool 6 and a tyre-demounting tool 7, arranged diametrically opposite one another with respect to the axis B of the tool-bearing turret 5.

The tool-bearing turret 5 is coupled to the slide 33 such as to be able to rotate on itself about axis B.

The rotation can be done manually by an operator or can be done by special automatic moving means of known type.

Thanks to this rotation, the tool-bearing turret 5 can be selectively blocked in a first operating position (shown in the figures) in which it faces the bead-breaking tool 6 towards the wheel-bearing chuck 4, or in a second operative position (not illustrated) in which the positions of the bead-breaking tool 6 and the tyre-demounting tool 7 are inverted, the tyre-demounting tool 7 facing towards the wheel-bearing chuck 4.

As illustrated in FIGS. 3 and 4, the bead-breaking tool 6 is defined by a disc, of known type, which is preferably made of steel and specially shaped such as not to damage the wheel rims.

The bead-breaking disc 6 is substantially truncoconical cup-shaped, and is fixed to the end of a coaxial shaft 60, which shaft 60 is rotatably coupled idle internally of a guide bush 61, such that the bead-breaking disc 6 can rotate freely about the axis thereof D.

The axis D is inclined with respect to the rotation axis A of the wheel-bearing chuck 4, to which it is preferably coplanar.

The axis D is also preferably coplanar with the axis B of the tool-bearing turret 5, and is inclined with respect thereto by a complementary angle with respect to the angle formed with the rotation axis A.

In more detail, the guide bush 61 is fixed on the upper side of an oscillating con rod 62, which is interposed between the opposite wings of a fork-shaped portion of the head element 51.

A first end of the oscillating con rod 62 is pivoted to the wings of the head element 51 via a hinge pivot 63 defining a hinge axis E that is perpendicular to the axis D of the bead-breaking disc 6, such that an oscillation of the con rod 62 with respect to the head element 51 can change the inclination of the bead-breaking disc 6 with respect to the rotation axis A of the wheel-bearing chuck 4.

As illustrated in FIG. 4, the second end of the oscillating con rod 62 is hinged to the piston of a double-acting jack 64, preferably hydraulically-activated, which is housed internally of the forked portion of the head element 51, and the cylinder of which is in turn hinged to the tubular support 50 body, in which it is partially contained.

The double-acting jack 64 is connected to relative supply and discharge conduits (not illustrated) for the operating fluid destined to make the jack 64 function, and is further preferably associated to manual control means (also not shown) by means of which an operator can command sliding in both directions of the piston in the cylinder, and if necessary stopping it in any intermediate position between the completely inserted position and the completely extracted position.

Figure 5:
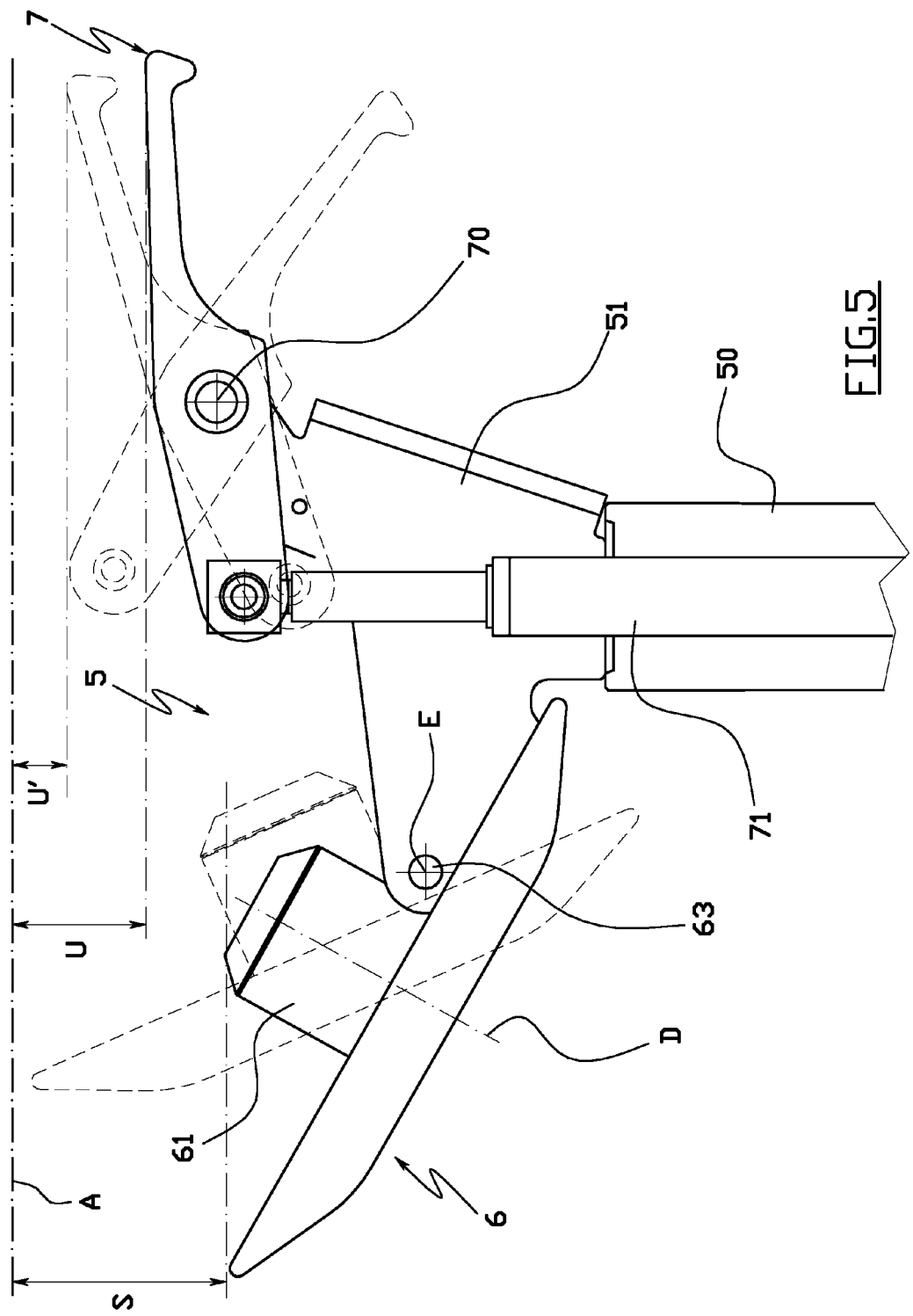
FIG. 5 is the tool-bearing turret of FIG. 3, in an enlarged view, and in which a broken line shows some possible positions, respectively of the bead-breaking tool and the tyre-demounting tool.

In this way, the operator can rotate the bead-breaking disc 6 continuously between the two extreme positions shown in FIG. 5, thus obtaining a corresponding change in inclination thereof with respect to the rotation axis A of the wheel-bearing chuck 4.

Observe that the extreme positions are respectively a position of maximum inclination, illustrated with a broken line, and a position of minimum inclination, illustrated with a continuous line.

The manual means for controlling the double-acting jack 64 can comprise a joystick, a keyboard or any other manual control means.

The tyre-demounting tool 7 is defined by a shaped lever which is hinged to the head element 51 as a rocker arm by means of a hinge pivot 70 having an axis which is perpendicular to the rotation axis of the wheel-bearing chuck 4. The projecting end of the tyre-demounting lever 7 is substantially hook-shaped, such as to be able to hook the bead of a tyre.

The opposite end is hinged to the piston of a double-acting jack 71, preferably hydraulically-activated, the cylinder of which is in turn hinged to the external flank of the tubular support body 50 of the tool-bearing turret 5.

The double-acting jack 71 is controllable to oscillate the tyre-demounting lever 7 between the two extreme positions illustrated by a broken line in FIG. 5, possibly blocking it at least in the intermediate position denoted by the continuous line.

Observe that in any position the minimum radial distance U, U' which separates the tyre-demounting lever 7 from the rotation axis A of the wheel-bearing chuck 4 is constantly less than the minimum radial distance S which separates the axis A from the bead-breaking disc 6 when the disc 6 is in the minimum-inclined position.

The functioning of the tyre-changing machine 1 includes blocking a deflated wheel on the wheel-bearing chuck 4, with the aid of special raising devices, while the slides 32 and 33 are at the maximum reciprocal distance.

The tool-bearing turret 5 is blocked in the first operating position, in which it faces the bead-breaking tool 6 towards the lateral flank of the tyre of the wheel mounted on the wheel-bearing chuck 4.

Using the manual control means the operator can regulate the inclination of the bead-breaking disc 6 according to the shape and dimensions of the tyre of the wheel.

The wheel-bearing chuck 4 is thus set in rotation and the slides 32 and 33 are reciprocally neared, such that the bead-breaking disc 6 is pressed against the tyre flank, pushing it towards the inside of the groove of the rim, up until the bead of the tyre is detached from the rim edge.

During this axial pressure, the operator can contemporaneously vary the inclination of the bead-breaking disc 6, such as to exert a lever action which tends to radially distance the tyre bead from the rim edge, unseating it and facilitating detachment thereof.

Alternatively the change in inclination can be commanded while the bead-breaking disc 6 is axially stationary in contact with the tyre.

In both cases it is preferable that the change in inclination in the bead-breaking disc 6 occurs while the wheel is continuing to rotate, together with the wheel-bearing chuck 4 about the axis A, such as entirely to detach the tyre bead from the rim edge.

The translating motion of the slides 32 and 33 and the rotating movement of the bead-breaking disc 6 might also be managed by an automatic control system, specially programmed or programmable according to the type of the wheel to be treated.

When the stage of tyre bead-breaking has been completed, the wheel-bearing chuck 4 is stopped and the slides 32 and 33 are reciprocally distanced.

The tool-bearing turret 5 is thus rotated about itself about axis B, and blocked in the second operating position, in which it brings the tyre-demounting lever 7 to face the detached bead of the tyre.

At the same time, the bead-breaking disc 6 is blocked on the tool-bearing turret 5 in the position of minimum inclination with respect to the rotation axis A.

The slides 32 and 33 are newly neared, such that the tyre-demounting lever 7 can insert between the rim edge and the tyre bead, which is thus unhooked and distanced from the rim edge.

The functioning of the tyre-demounting lever 7 is of known type and is therefore not described in greater detail.

It is however worth noting that during all the demounting stages, the bead-breaking disc 6 never interferes with the demounting lever 7, as when the bead-breaking disc 6 is in the minimum-inclined position, the radial distance separating it from the axis A of the wheel A is greater than the radial distance separating the axis A from the tyre-demounting lever 7.

After the tyre bead has been unhooked from the tyre-demounting lever 7, the slides 32 and 33 are newly distanced from one another, such that the tyre-demounting lever 7 partially extracts the bead from the rim groove.

Finally, the wheel-bearing chuck 4 is reset in rotation, so that by running on the tyre-demounting lever 7, the tyre bead is entirely extracted from the rim.

Obviously a technical expert in the sector might make numerous modifications of a technical-applicational nature to the tyre-changing machine as described herein above, without its forsaking the ambit of the invention as claimed herein below.

In particular, although a heavy-duty tyre-changing machine has been described, the characteristics of the invention might also be effectively applied to a light tyre-demounting machine, i.e. for typical car-tyres.

The invention claimed is:

1. A tyre-changing machine comprising support means (4) for a wheel, a tool-bearing arm (50) at an end of which a bead-breaking tool (6) is hinged according to a hinge axis (E) which is perpendicular to an axis (A) of the wheel, and first motorised means (32, 33) for causing a relative movement, in a parallel direction to the axis (A) of the wheel, between the support means (4) and the tool-bearing arm (50), such as to press the bead-breaking tool (6) against a flank of a tyre on the wheel, wherein said machine comprises second motorised means (64), able to activate independently from the first motorised means (32, 33), which second motorised means (64) are destined to rotate the bead-breaking tool (6) about the hinge axis (E) with the tool-bearing arm (50), in order to vary an inclination of the bead-breaking tool (6) with respect to the axis (A) of the wheel which is mounted on the support means (4), wherein the second motorised means (64) are controllable such as to be able to rotate the bead-breaking tool (6) continuously between two extreme end positions in both directions and to be able to stop the bead-breaking tool (6) in intermediate positions between the end positions, wherein a tyre-demounting tool (7) is further mounted on the tool-bearing arm (50), and wherein the second motorised means (64) rotate the bead-breaking tool (6) between two extreme end positions, in at least one of which the bead-breaking tool (6) is at a minimum radial distance from the axis (A) of the wheel mounted on the support means (4), which is greater than the minimum radial distance separating the axis (A) of the wheel from the tyre-demounting tool (7), wherein the bead-breaking tool (6) and the tyre-demounting tool (7) are both coupled to a tool-bearing turret (5) and are oriented in different directions, wherein the tool-bearing turret (5) is rotatable about an axis (B) perpendicular to the hinge axis (E), to be locked in a first operative position, in which the bead-breaking tool (6) faces the support means (4) and the tyre-demounting tool (7) faces away from the support means (4), and a second operating position, in which the tyre-demounting tool (7) faces the support means (4) and the bead-breaking tool (6) faces away from the support means (4), whereby the bead-breaking tool (6) and the tyre-demounting tool (7) are selectively activated by rotation of the tool-bearing turret (5).

2. The machine of claim 1, wherein the motorised means (64) are destined to rotate the bead-breaking tool (6), when the bead-breaking tool (6) is in contact with the flank of the tyre on the wheel mounted on the support means (4).

3. The machine of claim 1, wherein the second motorised means (64) are associated to manual control means which are destined to activate the second motorised means (64) in order to cause rotation of the bead-breaking tool (6).

4. The machine of claim 1, wherein the second motorised means (64) are associated to automatic control means.

5. The machine of claim 1, wherein the second motorised means comprise a double-acting jack (64).

6. A bead-breaking method using a tyre-changing machine as in claim 1, comprising stages of blocking a wheel on the support means (4), causing a relative movement, in a parallel direction to an axis (A) of the wheel, between the support means (4) and the tool-bearing arm (50), such as to press the bead-breaking tool (6), hinged to said tool-bearing arm (50), against a flank of the tyre of the wheel, characterised in that it comprises a stage of rotating the bead-breaking tool (6) about a hinge axis (E) with the tool-bearing arm (50), while the bead-breaking tool (6) is in contact with the tyre, such as to exert an action which tends to distance the tyre bead from the rim edge in such a way as to be able to stop the bead-breaking tool (6) in intermediate positions between the end positions.

7. The method of claim 6, characterised in that the rotation of the bead-breaking tool (6) is done during relative movement in an axial direction between the tool-bearing arm (50) and the wheel.

8. The method of claim 6, characterised in that the rotation of the bead-breaking tool (6) is performed while the tool-bearing arm (50) is axially stationary with respect to the wheel.

9. The method of claim 6, characterised in that the rotation of the bead-breaking tool is done while the wheel mounted on the support means (4) is rotating about the axis thereof (A).

10. The machine of claim 1, wherein the bead-breaking tool (6) and the tyre-demounting tool (7) are oriented in opposite directions facing away one from the other.

11. The machine of claim 1, wherein the tyre-demounting tool (7) is hinged to the tool-bearing turret to oscillate between end positions.

12. The machine of claim 11, wherein the tyre-demounting tool (7) is connected to a double-acting jack to be controlled in its oscillation.

13. The machine of claim 1, wherein the bead-breaking tool (6) is connected to a double-acting jack configured to control its oscillation about axis (E).

* * * * *